Nov. 18, 1930.   P. A. MANNING ET AL   1,782,268
AUTOMATIC AIR RELEASE FOR AIR BRAKES.
Filed Oct. 10, 1928
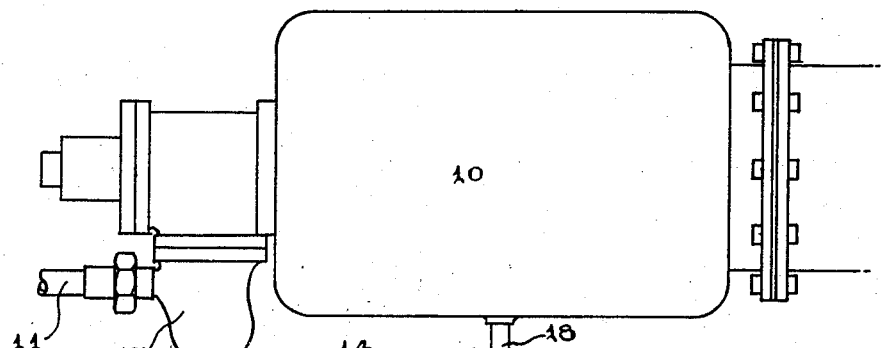
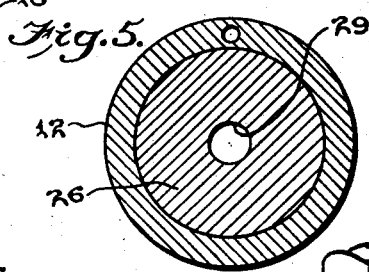
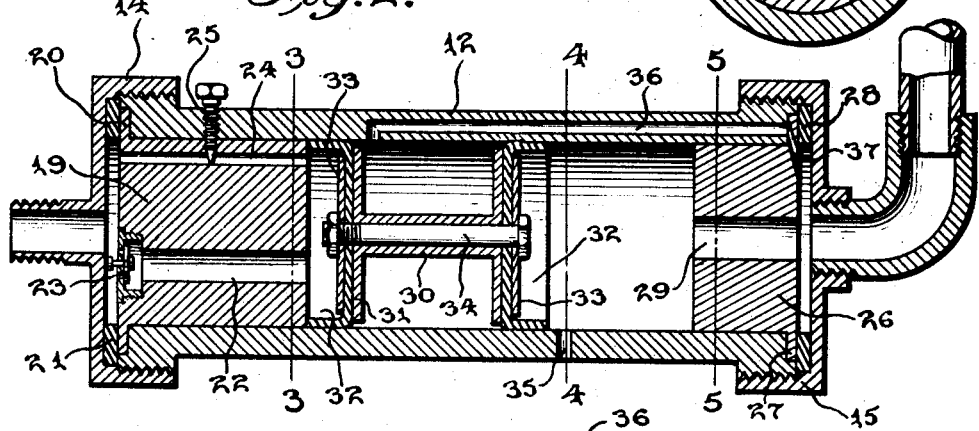
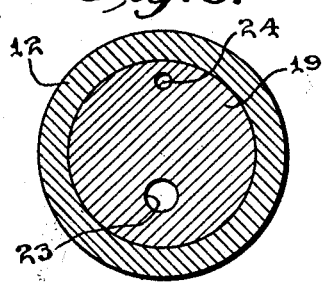
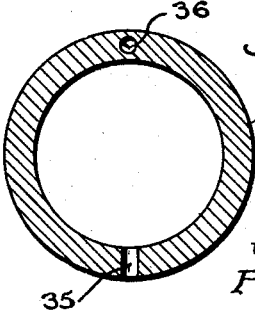
Inventors
J. W. Gates
P. A. Manning
By
Attorney Patented Nov. 18, 1930

1,782,268

UNITED STATES PATENT OFFICE

PAUL A. MANNING, OF MADISON, ILLINOIS, AND JOSEPH W. GATES, OF ST. LOUIS, MISSOURI

AUTOMATIC AIR RELEASE FOR AIR BRAKES

Application filed October 10, 1928. Serial No. 311,670.

The object of the invention is to provide a device adapted for incorporation in the air brake installation of railway cars, whereby when conditions arise making it necessary that the air brake shall not function, as when the section of the freight is "shot" into a siding, the auxiliary reservoir of the air brake installation may be automatically discharged, thus making it unnecessary that trainmen give individual attention to each car for this purpose; to provide a device of the nature above indicated in which the rate of discharge from the auxiliary reservoir may be regulated by proper adjustments, so that the discharge from certain reservoirs may be extended over a considerable period of time, whereby, should a train break in two, the air brake mechanism would be left in condition to function until the crew shall have had time to set all necessary hand brakes; and to provide a device of this nature which is composed of comparatively few parts and therefore susceptible of cheap manufacture and low marketing cost, and of such a form that it may be readily applied to existing installations without any modifications thereof.

With this object in view the invention consists in a construction and combination of parts of which a preferred embodiment is illustrated in the accompanying drawings, wherein:

Figure 1 is a side elevational view illustrating the auxiliary reservoir and triple valve of an air brake installation, the invention being shown mounted in operative position in connection with these parts.

Figure 2 is a central longitudinal sectional view of the automatic release device constituting the invention.

Figures 3, 4 and 5 are transverse sectional views on the planes indicated by the lines 3—3, 4—4 and 5—5 respectively of Figure 2.

The invention consists in an automatic air releasing means for discharging the air from the auxiliary reservoir 10 when the air brakes are to be rendered inactive or inert, as frequently becomes necessary on freight cars where train sections are "shot" into sidings. Connection is made between the auxiliary reservoir 10 and the train line 11 through the release device constituting the invention, the latter comprising the cylinder 12 closed at its ends by threaded caps 14 and 15 being connected with the train line by suitable pipe connections 16 coupled to the lower end of the triple valve 17, the connection with the auxiliary reservoir being by appropriate pipes and fittings 18 coupled to the port provided for the reception of the conventional relief cock.

Within the cylinder 12 at that end closed by the cap 14 is a plug 19, flanged on one end as indicated at 20, this flange sitting on the end of the cylinder and engaging a gasket 21, the latter being held in contact with the flange by the cap 14 and the plug thereby being retained in proper position in the center and the joints made airtight. Axial channel 22 is formed in the plug 19, this channel constituting the air conduit for the cylinder 10. A check valve 23 is mounted in the channel 22, this channel serving to admit air from the train line into the cylinder but precluding its escape therefrom at this point. A second axial channel 24, smaller than the channel 22, is also formed in the plug 19 and this channel is invaded by a regulating valve 25 consisting of a pointed screw threaded radially through the cylinder wall and the plug 19.

That end of the cylinder closed by the cap 15 carries a plug 26 flanged at 27 in the same manner as the plug 19 and retained in position by the cap 15 with a gasket 28 interposed between the two. The plug 26 is formed with an axial channel 29 to establish communication between the auxiliary reservoir and the interior of the cylinder through the pipe connection 18.

Movable between the two plugs is a double ended piston consisting of a tubular core 30 formed with terminal disks 31 against which are seated cupped flexible washers 32, these washers being retained in place on the disks or heads 31 by means of metallic washers 33 through which extends a bolt 34, the bolt extending through the tubular core and serving as a common attaching means for the two cupped washers 32 and their retaining washers 33.

A discharge port 35 is formed in the wall of the center at an intermediate point and constitutes a means of placing the cylinder interiorly in communication with the atmosphere. Diametrically opposite the port 35, the cylinder wall is formed with an axial channel 36 of which one end communicates with the interior of the cylinder at a point nearer the plug 19 than the point of location of the port 35. The opposite end of the channel 36 is placed directly in communication with the pipe connection 18 to the auxiliary reservoir through a port 37 formed in the plug 26 at the flange 27.

In the operation of the invention, when pressure is applied to the train line the triple valve 17 functions in the usual way to permit charging of the auxiliary reservoir 10. The cylinder 12 also being in communication with the train line, air is admitted through the check valve 23 thus moving the double ended piston toward the plug 26, this piston passing and closing the port 35 so that the escape from the auxiliary reservoir is cut off. Thus charging of the auxiliary reservoir takes place not only through the triple valve but through the channel 36 after the piston shall have passed the point of communication of this channel with the cylinder. With the double ended piston over against the plug 29 there is balanced auxiliary reservoir pressure on opposite sides of the piston—through the channel 29 and through the channel 36. In the setting of the brakes of the train, pressure in the train line 11 is reduced and the auxiliary reservoir, through the triple valve, charges the brake cylinders and sets the brake. On reduction of train line pressure there is established an unbalance of pressure between the auxiliary reservoir and the train line through the channel 36 and channel 24, but the escape of air through the latter channel is at such a slow rate that there is no interference with the operation of the brake cylinders, because the channel 36 being cross-sectionally greater than the channel 24, auxiliary reservoir pressure is applied to the train line directly through the latter only as fast as air will be passed by the valve 25. Thus there is no tendency for the double ended piston to move and it retains its position adjacent the plug 26. Where a section of the train is being "shot" onto a siding, where the train line connection will be broken at the point of uncoupling the section, the air brakes on the cars would be set by reason of the action of the triple valve in diverting the air from the auxiliary reservoir into the brake cylinders, if the auxiliary reservoir had not first been discharged. Under such a condition the invention automatically works to discharge the auxiliary reservoir of each car of a train section passed onto the siding. The braking of the train line at the point of uncoupling the section attended of course with the opening of the angle cock on the terminal car of the section, will result in the reduction of the air line of the section to atmospheric pressure, whereupon the auxiliary reservoir will be discharged first through the channel 36 and channel 24, but since this rate of discharge is slow and since there is a great unbalance of pressure between the air line under such conditions and the auxiliary reservoir due to the channel 24 (whatever the setting of the valve 25) bleeding the cylinder at a great enough rate to create this pressure unbalance, the air in the latter auxiliary reservoir will act directly on the double ended piston, moving it over adjacent the plug 19 and exposing the port 35 through which the air in the auxiliary reservoir is discharged to the atmosphere and the brake cylinders emptied. When the double ended piston passes over to the plug 19, the channel 36 at its point of communication with the cylinder 12 is cut off.

The rate at which the double ended piston moves by reason of pressure in the auxiliary reservoir is dependent upon the discharge of air ahead of it—between it and the plug 19—and the valve 25 may be set so as to make this discharge relatively high or relatively low. Where trains are operating in hilly country, therefore, the valve 25 may be set to provide a low rate of discharge, so that in the event of a break in the train, the air brakes may be set by the operation of the triple valve and not released until after a comparatively long interval of time which will give the crew ample time to set the hand brakes. With the valve 25 set to provide a low rate of discharge through the channel 24, the movement of the double ended piston, with the train line reduced to atmospheric pressure, will be comparatively slow and the time elapsing between the moment at which it starts movement from the plug 26 until it exposes the port 35 for the interval in which the air brakes are effective and the interval when the hand brakes must be set by the train crew.

The invention having been described what is claimed as new and useful is:

1. In combination with the train line and auxiliary reservoir and triple valve of an air brake mechanism, means connecting the auxiliary reservoir with the train line and automatically discharging the air from the reservoir upon reduction of the train line to atmospheric pressure, said means being adjustable to vary the time interval between the moment of the reduction of the train line to atmospheric pressure and the instant of discharge from the reservoir.

2. In combination with the train line and auxiliary reservoir and triple valve therefor of an air brake mechanism, means connecting the auxiliary reservoir with the train line and subject to the pressure in the two, said means having an actuated element irresponsive to the reduction of train line pressure for service operation but responsive to discharge the auxiliary reservoir to the atmosphere on reduction of train line pressure to atmospheric pressure.

3. In combination with the train line and auxiliary reservoir and triple valve therefor of an air brake mechanism, a cylinder terminally connected respectively with the auxiliary reservoir and the train line, a double ended piston carried in said cylinder and subjected to pressure on opposite ends from the train line and reservoir respectively, the cylinder having an air port effecting communication between its interior and the atmosphere and exposed by the piston in one position of the latter.

4. In combination with the train line and auxiliary reservoir and triple valve therefor of an air brake mechanism, a cylinder terminally connected respectively with the auxiliary reservoir and the train line, a double ended piston carried in said cylinder and subjected to pressure on opposite ends from the train line and reservoir respectively, the cylinder having an air port effecting communication between its interior and the atmosphere and exposed by the piston in one position of the latter, the cylinder having an air channel in communication with the auxiliary reservoir and in communication with the cylinder on that side of the piston exposed to train line pressure except in the exposed position of the air port.

5. In combination with the train line and auxiliary reservoir and triple valve therefor of an air brake mechanism, a cylinder terminally connected respectively with the auxiliary reservoir and the train line, a double ended piston carried in said cylinder and subjected to pressure on opposite ends from the train line and reservoir respectively, the cylinder having an air port effecting communication between its interior and the atmosphere and exposed by the piston in one position of the latter, the cylinder having an air channel in communication with the auxiliary reservoir and in communication with the cylinder on that side of the piston exposed to train line pressure except in the exposed position of the air port, that end of the cylinder exposed to train line pressure being provided with an adjustable valve for regulating the rate for equalization of pressure in the air cylinder and train line when there is a reduction in the latter.

6. In combination with the train line and auxiliary reservoir and triple valve therefor of an air brake mechanism, a cylinder terminally connected respectively with the auxiliary reservoir and the train line, a double ended piston carried in said cylinder and subjected to pressure on opposite ends from the train line and reservoir respectively, the cylinder having an air port effecting communication between its interior and the atmosphere and exposed by the piston in one position of the latter, the cylinder having an air channel in communication with the auxiliary reservoir and in communication with the cylinder on that side of the piston exposed to train line pressure except in the exposed position of the air port, that end of the cylinder exposed to train line pressure being provided with an adjustable valve for regulating the rate for equalization of pressure in the air cylinder and train line when there is a reduction in the latter, that end of the cylinder exposed to train line pressure being provided with a check valve controlling communication between the train line and the cylinder and opening towards the latter.

In testimony whereof they affix their signatures.

PAUL A. MANNING.
JOSEPH W. GATES.